(12) United States Patent
Arat

(10) Patent No.: US 6,273,256 B1
(45) Date of Patent: Aug. 14, 2001

(54) DISC CASE

(75) Inventor: Hakim Arat, Tampere (FI)

(73) Assignee: ATSI OY, Tampere (FI)

( * ) Notice: Subject to any disclaimer, the term of this patent is extended or adjusted under 35 U.S.C. 154(b) by 0 days.

(21) Appl. No.: 09/462,879

(22) PCT Filed: Aug. 6, 1998

(86) PCT No.: PCT/FI98/00613

§ 371 Date: Feb. 29, 2000

§ 102(e) Date: Feb. 29, 2000

(87) PCT Pub. No.: WO99/08276

PCT Pub. Date: Feb. 18, 1999

(30) Foreign Application Priority Data

Aug. 7, 1997 (FI) ..................................................... 973266

(51) Int. Cl.[7] .............................................. B65D 85/575
(52) U.S. Cl. ................................. 206/387.12; 312/9.47; 312/9.48
(58) Field of Search ...................... 206/387.12; 312/9.47, 312/9.48

(56) References Cited

U.S. PATENT DOCUMENTS

| 3,969,007 | * | 7/1976 | Lowry | 312/9.21 |
|---|---|---|---|---|
| 4,664,454 | * | 5/1987 | Shatteman et al. | 312/9.19 |
| 4,734,814 | | 3/1988 | Fujino et al. | 360/133 |
| 4,875,578 | | 10/1989 | Nehl | 206/309 |
| 5,000,316 | | 3/1991 | Lerner | 206/309 |

FOREIGN PATENT DOCUMENTS

| 3638912 | 11/1986 | (DE) . |
|---|---|---|
| 4236596 | 9/1993 | (DE) . |
| 9316471 | 8/1993 | (WO) . |

* cited by examiner

Primary Examiner—Paul T. Sewell
Assistant Examiner—Troy Arnold
(74) Attorney, Agent, or Firm—Ladas & Parry

(57) ABSTRACT

A disc case for a compact disc or the like is provided. The disc case includes a pair of plate-like flank walls, a side wall interconnecting the flank walls, a side of the case having an opening therein for insertion and removal of a disc, a slide track means, slide means movable in the slide track means, and means for controlling withdrawal of the disc from the disc case. The means for controlling withdrawal of the disc includes inner and outer pins associated with the slide means, and slide track means including pin guides for guiding movement of the inner and outer pins such that when the slide means is pushed toward the opening for withdrawing the disc from the disc case, the inner pin moves upwardly in its pin guide and away from the disc, and the outer pin moves downwardly in its pin guide and towards the disc to prevent the disc from falling out of the case.

6 Claims, 4 Drawing Sheets

DISC CASE

Figure 1:
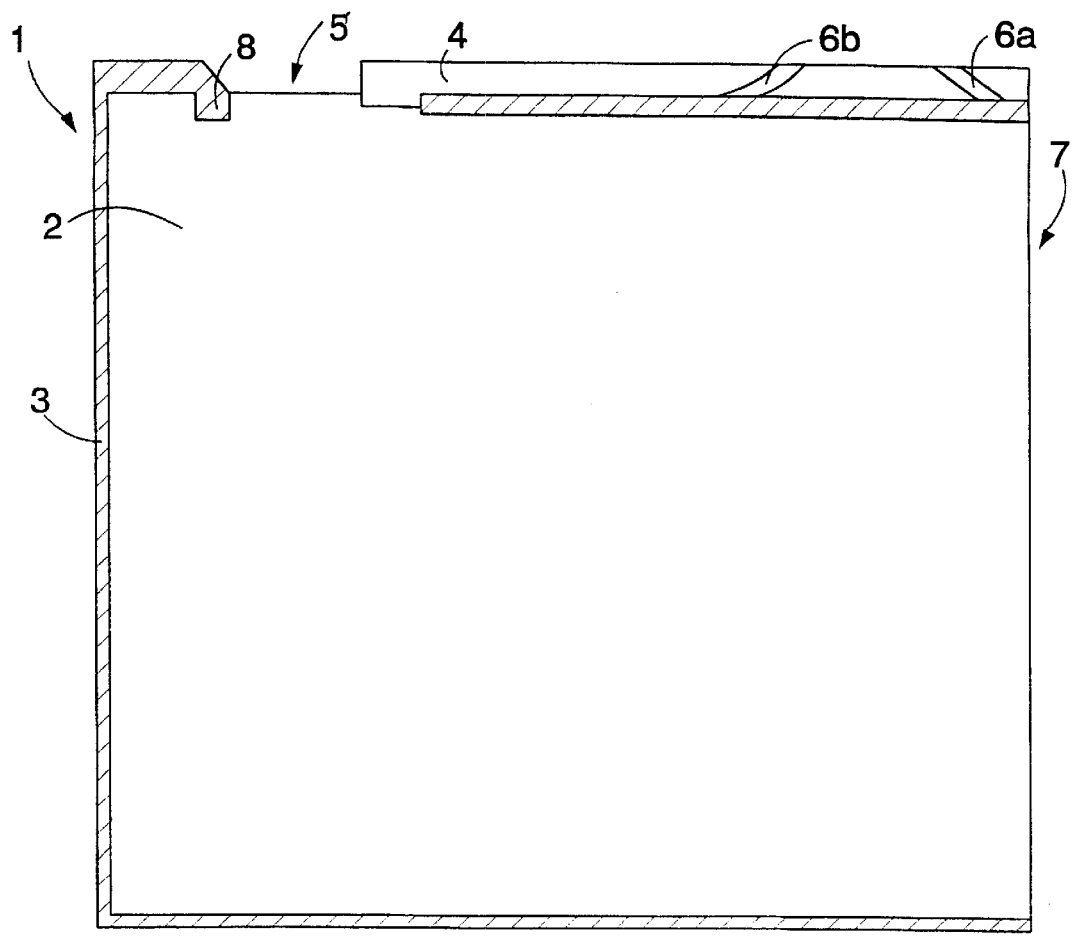

The invention relates to a disc case for a compact disc or the like, the disc case comprising two plate-like flank walls, side walls interconnecting the flank walls in such a manner that an opening is provided at the edge of the disc case for inserting a disc into the case and removing it from the disc case, a slide by means of which the disc can be removed from the case, and means for preventing the disc from dropping when the disc is extracted from the case.

At present, a drawback of compact disc cases is that they are difficult to open; for example small children find it extremely difficult to handle the cases. Furthermore, the durability of the cases is relatively poor. There is also the risk of the discs becoming dirty or even being damaged when they are removed from the cases.

DE 36 38 912 discloses a case which is uniform in construction, and which has an opening at the edge for inserting and removing a disc. A spring is provided on the edge of the case to ensure that the disc remains in place. The case is difficult to use and in order to extract the disc the user must grasp the top and bottom surfaces of the disc by hand. Furthermore, the spring on the edge of the case may damage the disc.

U.S. Pat. No. 4,734,814, DE 42 36 596 and WO 93/16471 also disclose disc cases of uniform construction with a slit for inserting and removing a disc on one edge of the case. Furthermore, a lever or a slide for removing the disc from the case is provided in these cases. The discharge of the disc from the case is prevented or slowed by spring means. The cases are extremely complex in construction and thus difficult and expensive to manufacture. Moreover, the spring equipment may damage the disc, particularly while the disc is being inserted. Also, the levers and slides are such in construction that they may press the disc unevenly and thus damage it.

U.S. Pat. No. 5,000,316 also discloses a case with an open edge. The case further comprises a device housed within the case, on which a disc partly lies and which can be latched at the end position. When the disc is extracted, the latching is unlatched and the disc is partly ejected, whereby it is accessible for use. The disc is here held back and guided while being inserted by a hub fitting in the disc center hole. The case has a complex construction and is thus difficult and expensive to manufacture. Furthermore, the disc is rather difficult to handle.

U.S. Pat. No. 4,875,578 discloses a container comprising several superimposed sliders. Each slider can partly protrude from the container. The sides of the sliders are provided with pins arranged in a longitudinal guide, whereby the sliders can move in the direction of the guide. The guides are provided with inclined sections that move the pins downward simultaneously pressing the slider downward near the end of the withdrawal and braking the movement of the slider by means of friction. When the slider partly protrudes from the slider, it must be opened and the disc must be withdrawn by grasping it by hand, whereby the disc becomes dirty and may be damaged. Furthermore, the braking mechanism of the slider may damage the slider. The container is difficult to use and complex in construction.

It is an object of the present invention to provide a disc case in which the above disadvantages can be avoided.

The disc case of the invention is characterized in that the slide comprises at least two pins and correspondingly, the case comprises pin guides in such a manner that when the slide is in the farthest position from the opening of the case, the inner pin located farthest from the opening is guided inwards in the case on account of the inner pin guide corresponding to said pin in such a manner that the inner pin prevents the disc from discharging from the case, whereby the outer pin located nearest to the opening is guided outwards in the case on account of the outer pin guide corresponding to said pin, and that when the slide is in the position nearest to the opening of the case, the inner pin is guided outwards on account of the inner pin guide so as to allow the disc to pass the inner pin, and the outer pin is guided inwards on account of the outer pin guide in such a manner that the outer pin prevents the disc from falling out of the case.

The essential idea of the invention is that the case is provided with an opening at one edge of the case, through which opening a disc can be inserted in and removed from the case. The case further comprises a slide provided with at least two pins and correspondingly, guides provided on the edge of the case in such a manner that when the slide is in the farthest position from the opening of the case, the pin located farthest from the opening is guided inwards in the case on account of the pin guide corresponding to said pin in such a manner that that the pin prevents the disc from discharging from the case. The pin nearest to the opening is then guided outwards in the case on account of the guide corresponding to said pin. Furthermore, when the slide is in the position nearest to the opening, the pin located farthest from the opening is guided outwards on account of the corresponding guide so as to allow the disc to pass said pin and the pin nearest to the opening is guided inwards on account of the corresponding guide in such a manner that said pin prevents the disc from moving, in other words falling out of the case. When the slide is moved away from the opening, the pin and the guide release the movement of the disc so as to allow the disc to be ejected from the case. Furthermore, the idea of a preferred embodiment is that, seen from the direction of insertion of the disc, the case opening is wider in the center part and narrows towards the edges of the case.

An advantage of the invention is that the construction of the case is simple and thus reliable and cost-effective to manufacture. Furthermore, the case can be handled by one hand, which is significantly advantageous to safety when used in cars, for example. Moreover, it is not necessary to touch the disc by hand since the disc can be ejected directly to a playing device by appropriately inclining the case, whereby the disc remains clean and undamaged upon removal from the case. Furthermore, the slide and the braking mechanism of the case do not press the disc, so it also remains undamaged in this respect. The forming of the opening to be wider in the central part and to narrow towards the edges means that when the disc is inserted into the case, only the edges of the disc come into contact with the edge of the opening, whereby the face of the disc remains undamaged while the disc is being inserted into the case.

Figure 3:
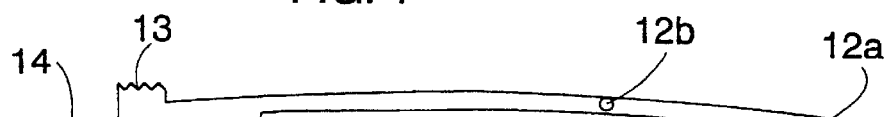
Figure 4:
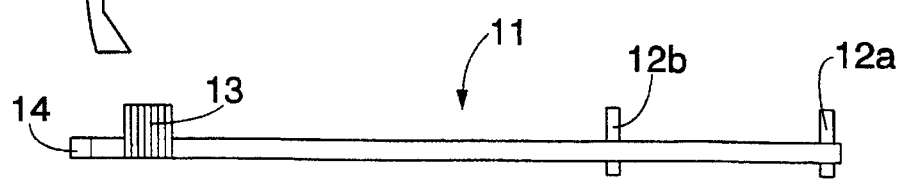
Figures 2, 5A:
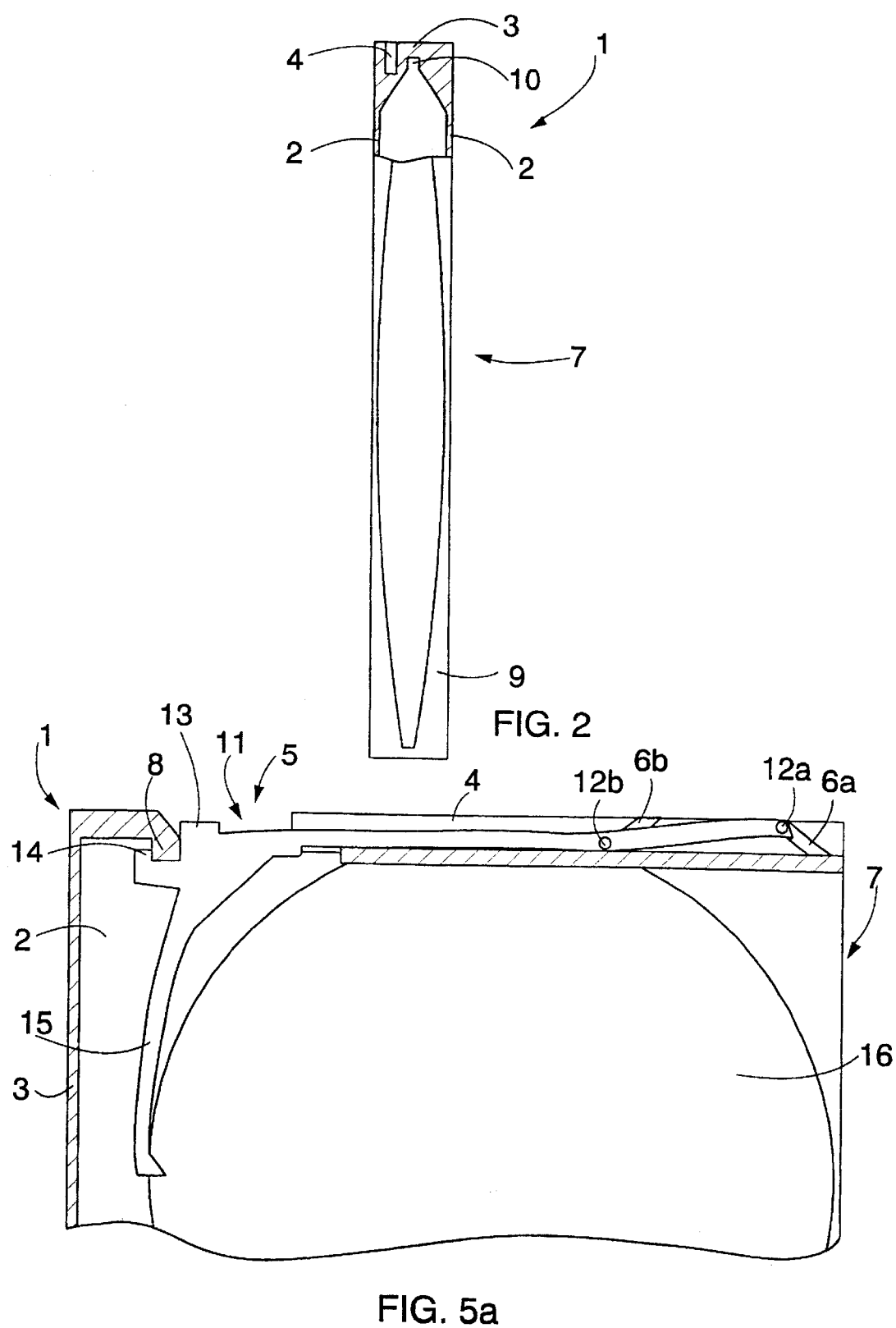

The invention will be described in closer detail in the accompanying drawings, in which FIG. 1 is a cross-sectional side view of a disc case of the invention, FIG. 2 is a sectional front view of the disc case in accordance with FIG. 1, FIG. 3 is a side view of a slide of the case in accordance with the invention, FIG. 4 shows the slide of FIG. 3 seen from above, and FIGS. 5*a* to 5*d* are sectional side views of the case of the invention, showing the slide in different positions.

FIG. 1 is a cross-sectional side view of a case 1 in accordance with the invention. For the sake of clarity, FIG.

1 does not show a slide contained in the case. The case 1 comprises plate-like flank walls 2, which are interconnected by side walls 3. The case 1 lacks a side wall on the right-hand side in FIG. 1, whereby an opening 7 is formed on the right-hand side of the case 1, through which opening a disc to be stored in the case 1 can be inserted into the case 1 and removed from it. A slide track 4 where the slide of the case 1 is housed is formed in connection with the top side wall 3 in FIG. 1. The case 1 further comprises a slide slit 5, which is needed to ensure that the slide can reciprocate over a distance.

Two pin guides 6a and 6b extend from the slide track 4 into a disc track 10 shown in FIG. 2. An outer pin guide 6a is located adjacent to the opening 7 of the case 1, and correspondingly, an inner pin guide 6b is spaced from the opening 7 of the case 1. The inner pin guide preferably inclines gradually at the beginning of its lower part, growing steeper towards the end. Preferably, the angle is about 10° in the beginning and about 40° in the end. The angle of the outer pin guide 6a in relation to the horizontal plane is preferably about 25° to 30°, whereby the slide moves extremely smoothly in the guides.

The case 1 further comprises a latching guard 8 located in the top side wall to enable the slide to be latched in the storage position of a disc.

FIG. 2 is a sectional view of the case 1 seen from the direction of the opening 7. The slide track 4 has an open top, whereby a slide is easy to mount in the case. The bottom of the slide track 4 also supports the slide. If desired, a plate can be mounted on top of the slide track 4 once the slide has been mounted, whereby the top of the slide is also covered at the slide track 4.

The opening 7 is preferably formed to be wider in the central part and to grow narrower towards the edges. The edges of the opening 7 are preferably curved substantially along the entire length of the opening. This can be implemented by providing the case with an opening panel 9 shaped in the above manner, for example. The opening 7 can also be formed to be of a desired shape without the opening panel 9, for example by shaping the flank walls 2 in such a manner that they form an opening 7 of a desired shape. When a disc is then inserted into the case 1, only the edges of the disc come into contact with the edge of the opening 7 irrespective of whether the disc is located in the middle of the opening 7 all the time while being inserted. The edges of the opening 7 cannot thus cause any damage to the face of the disc to be inserted into the case at any point. The disc inserted in the case 1 settles between the disc tracks 10 and is supported by them.

FIG. 3 is a side view of a slide 11 located in a slide track 4, and FIG. 4 shows the slide seen from above. The slide 11 comprises an outer pin 12a which is meant to be fitted into an outer pin guide 6a. Similarly, the slide 11 has an inner pin 12b which is meant to be fitted into an inner pin guide 6b. The pins 12a and 12b can extend to both sides of the slide 11, whereby the flank wall is also provided with guides corresponding to the pin guides 6a and 6b. The slide 11 is thus supported from two different sides by the pins and the guides. The slide 11 further comprises a guide jag 13, via which the movements of the slide 11 are guided. The upper part of the guide jag 13 is preferably serrated or uneven to keep the contact with the guide jag 13 from disappearing when the slide is guided. The slide 11 further comprises a latching jag 14, by means of which the slide 11 can be latched to a latching guard 8. The slide 11 further comprises a guide support 15 for supporting the disc to be installed into the case and guiding the disc at the back. The guide support 15 is preferably concave at its lower end, whereby the disc edge settles tightly within the concave lower end.

The slide 11 is not totally rigid, but it is resilient in construction or material at least in between the guide jag 13 and the inner pin 12b, whereby the slide 11 is allowed to move smoothly in the slide track 4 between the different positions. Similarly, the guide support 15 is made of a flexible material, whereby the guide support 15 does not cause damage to the disc stored in the case.

FIG. 5a shows a part of the case of the invention in a situation in which a disc 16, which can be a compact disc or some other corresponding round disc to be stored in the case, is housed within a case 1 in the storage position. In FIG. 5a, a slide 11 is latched at its rearmost position by means of a latching jag 14 and a latching guard 8. An inner pin 12b then prevents the disc 16 from discharging from the case 1. Being resilient, a guide support 15 is bent slightly backwards on account of the disc 16. The slide leans between the inner pin 12b and a guide jag 13 against the side wall 3 section below a slide track 4.

Figure 5B:
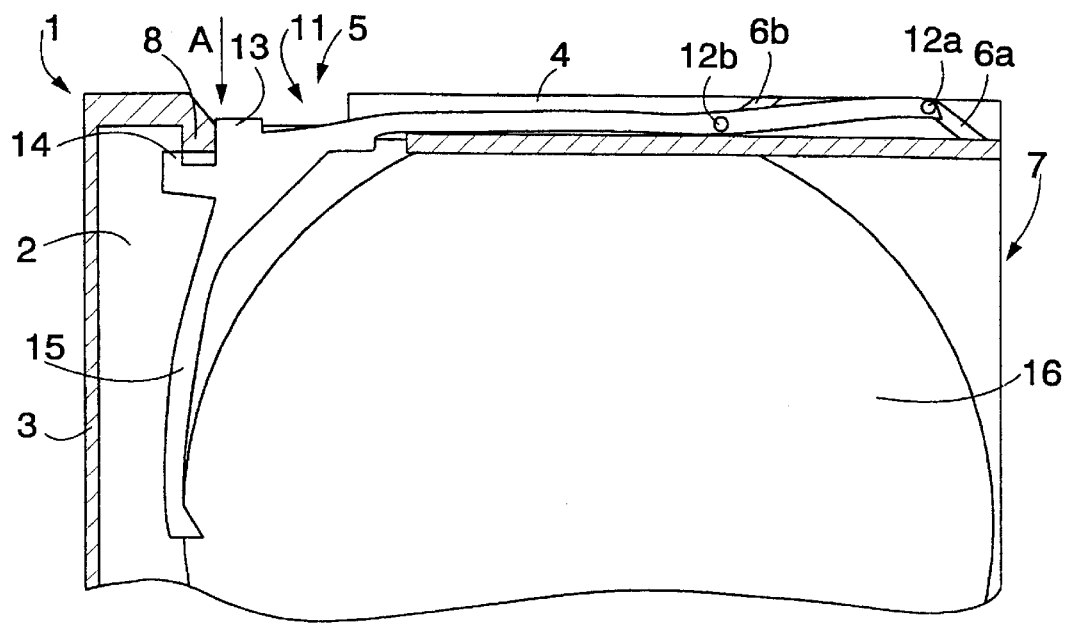
Figure 5C:
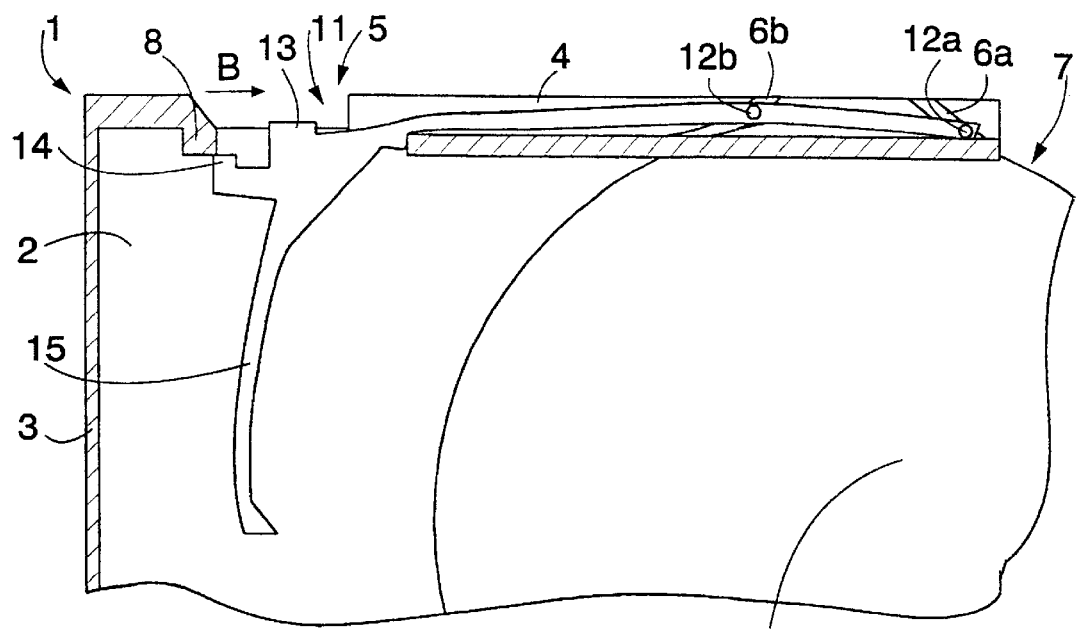

By pressing the guide jag 13 in the direction of arrow A in accordance with FIG. 5b, the slide 11 is released from the latching guard 8 and the latching jag 14. The slide 11 thus bends in relation to the end of the side wall 3 section below the slide track 4, whereby a force can be created which presses the disc 16 outwards. Next, by pushing the slide 11 in the direction of arrow B in accordance with FIG. 5c, the inner pin 12b moves upwards guided by an inner pin guide 6b when the slide is pushed forward. The guide support 15 then pushes the disc 16 outwards. On account of its resilience, the guide support 15 can be made to speed the movement of the disc 16. The movement of the disc 16 to the right in the figure is ensured by inclining the case 1 in such a manner that an opening 7 becomes inclined downwards. When the slide 11 is moved in the direction of arrow B, an outer pin guide 6a simultaneously guides the outer pin 12a inwards in such a manner that the outer pin 12a prevents the disc 16 from moving outwards from the position shown in FIG. 5c, whereby the disc 16 does not fall out of the case 1 uncontrollably. On the other hand, the outer pin 12a does not press the disc 16, but the outer pin 12a, guided by the outer pin guide 6a, is located in the position shown in FIG. 5c and the disc 16 only leans against the outer pin 12a. The slide 11 further comprises a stop step 17, which prevents the slide from moving too far in the direction of arrow B when it hits the side wall 3 section below the slide track 4.

Figure 5D:
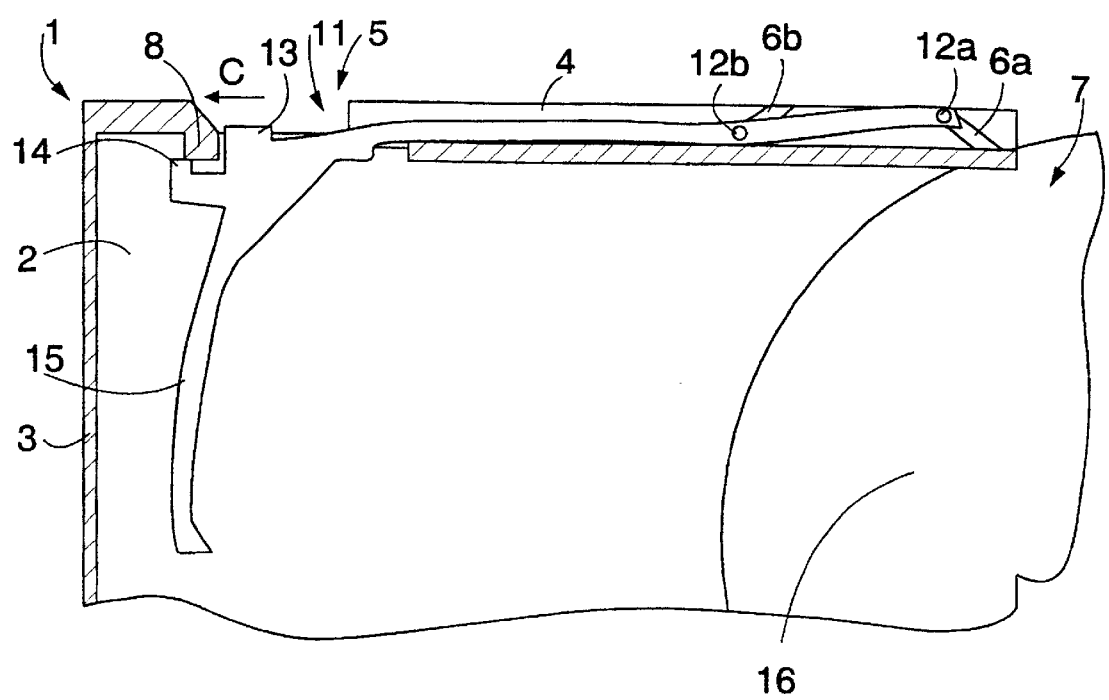

When the slide 11 is then moved in the direction of arrow C in accordance with FIG. 5d, the outer pin 12a moves outwards guided by the outer pin guide 6a and thus releases the disc 16, which can be removed from the case 1. The case 1 can be held in one hand and the slide can be simultaneously guided from the guide jag 13 by a finger of the same hand. By guiding the slide 11 the disc 16 can be removed from the case 1 directly into a player, for example, without touching the disc 16.

The disc 16 can be reinserted into the case 1 by pushing it by the edge into the case, whereby the movements of the slide 11 are reverse to those shown in FIGS. 5a to 5d. When the disc 16 is approaching the position shown in FIG. 5a, the guide support 15 can be pushed by the disc 16, whereby the slide 11 takes the position shown in FIG. 5a and on account of the resilience of the slide 11 the latching jag 14 can be snapped behind the latching guard 8, whereby the disc 16 is securely stored in the case 1.

The drawings and the accompanying description are only intended to illustrate the idea of the invention. The invention can vary in details within the scope of the claims. If desired, a flap or a cover can thus be arranged outside the opening 7, for example.

What is claimed is:

1. A disc case for a compact disc or the like, comprising:
   a pair of plate-like flank walls;
   a side wall interconnecting the flank walls;
   a side of the case having an opening therein for insertion and removal of a disc;
   a slide track means;
   a slide means movable in said slide track means; and
   means for controlling withdrawal of the disc from disc case,
comprising inner and outer pins associated with said slide means, said slide track means including pin guides for guiding movement of said inner and outer pins such that when the slide means is pushed toward the opening for withdrawing the disc from the disc case, the inner pin moves upwardly in its pin guide and away from the disc, and the outer pin moves downwardly in its pin guide and toward the disc to prevent the disc from falling out of the case.

2. A disc case as claimed in claim 1, wherein the pins extend to both sides of the slide.

3. A disc case as claimed in claim 1, wherein the slide is arranged in a slide track which is formed in such a manner that its bottom part at least partly supports the slide.

4. A disc case as claimed in claim 1, wherein the slide is made of a resilient material.

5. A disc case as claimed in claim 1, wherein the opening is formed to be wider in the central part and to narrow towards the edges of the case.

6. A disc case as claimed in claim 5, wherein the edges of the opening are curved substantially along the entire length of the opening.

* * * * *